(12) United States Patent
Garfinkel

(10) Patent No.: US 11,949,933 B2
(45) Date of Patent: Apr. 2, 2024

(54) SYSTEMS AND METHODS FOR MANAGING ACCESS TO CONTENT ASSETS

(71) Applicant: Comcast Cable Communications, LLC, Philadelphia, PA (US)

(72) Inventor: Richard Garfinkel, San Diego, CA (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 71 days.

(21) Appl. No.: 16/791,893

(22) Filed: Feb. 14, 2020

(65) Prior Publication Data

US 2021/0258624 A1  Aug. 19, 2021

(51) Int. Cl.
*H04N 21/2347* (2011.01)
*G06F 21/10* (2013.01)
*G06F 21/62* (2013.01)
*H04N 21/24* (2011.01)
*H04N 21/254* (2011.01)
*H04N 21/454* (2011.01)
*H04N 21/845* (2011.01)

(52) U.S. Cl.
CPC ......... *H04N 21/2541* (2013.01); *G06F 21/10* (2013.01); *H04N 21/2542* (2013.01); *H04N 21/454* (2013.01)

(58) Field of Classification Search
CPC .......................... H04N 21/2541; G06F 21/10
See application file for complete search history.

(56) References Cited

U.S. PATENT DOCUMENTS

2017/0316185 A1* 11/2017 Park ................... H04L 67/306
2019/0362055 A1* 11/2019 Rao .................... G06F 21/10

* cited by examiner

*Primary Examiner* — Hsiungfei Peng
*Assistant Examiner* — Fred Peng
(74) *Attorney, Agent, or Firm* — BakerHostetler

(57) ABSTRACT

Delay in output of a requested content asset by a user device may be reduced by sending a portion of the content asset to the user device in a particular type of format, such as an unsecured format. The unsecured portion of the content asset may be sent to the user device while a license for the content asset is being processed. The size of the unsecured portion of the content asset may be determined based on a time for the user device to receive the license. The time for the user device to receive the license may be determined based on a time to process the license. After sending the license to the user device, another portion of the content asset may be sent to the user device in a secured format. The user device may use the license to access the secured portion of the content asset.

20 Claims, 5 Drawing Sheets

SYSTEMS AND METHODS FOR MANAGING ACCESS TO CONTENT ASSETS

BACKGROUND

Content assets may be sent to users. Content assets may be protected. For example, content assets may be protected against unauthorized users, such as by being sent in a secured format. The content asset in the secured format may be sent to a user. However, the user may be unable to access the secured version of the content asset, such as if the secured version is encrypted. The user may wait to receive a license that enables the user to access the secured version of the content asset. As a result, there may be delay in output of the content asset as processing of the license may take a non-negligible amount of time.

SUMMARY

Delay in output of a requested content asset by a user device may be reduced by sending a portion of the content asset to the user device in a particular type of format, such as an unsecured format. The unsecured portion of the content asset may be sent to the user device while a license for the content asset is being processed. The size (e.g., file size, time duration, percent of the entire content asset, number of frames, number of packets, etc.) of the unsecured portion of the content asset may be determined based on a time for the user device to receive the license. The time for the user device to receive the license may be determined based on a time to process the license. After sending the license to the user device, another portion of the content asset may be sent to the user device in a secured format. The user device may use the license to access the secured portion of the content asset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
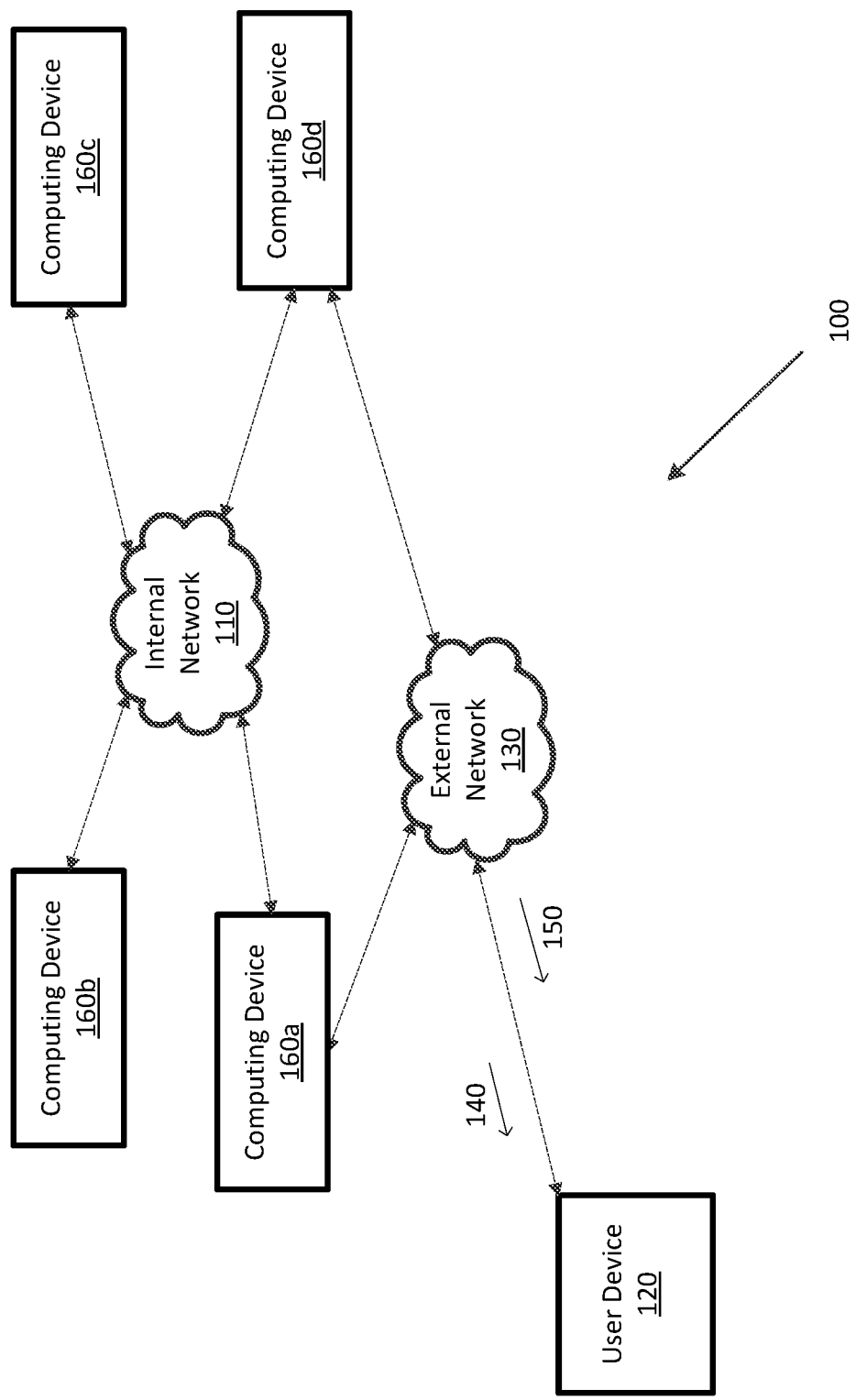
FIG. 1 is a diagram of an example system.

FIG. 1 shows an example system 100. The system 100 may comprise one or more computing devices, such as a first computing device 160*a*, a second computing device 160*b*, a third computing device 160*c*, and/or a fourth computing device 160*d*. One or more of the computing devices 160*a-d* may be configured to provide content assets. A content asset may comprise audio content, video content, image content, and/or text content, as examples. A content asset may comprise a television program, a movie, music, a game, and/or a book, as examples. The computing devices 160*a-d* may be configured to provide content assets by authenticating devices to determine authorization of the devices to access content assets. The computing devices may be configured to provide content assets by sending licenses for the content assets to authenticated devices. The computing devices 160*a-d* may comprise a content server, a video on-demand server, a license server, a key server, a packager, an encoder, and/or a scrambler, as examples. The computing devices 160*a-d* may comprise devices of a cloud computing network. For example, the first computing device 160*a* may comprise a content server. The fourth computing device 160*d* may comprise a license server, such as a digital rights management (DRM) license server.

The system 100 may comprise an internal network 110. The internal network 110 may comprise a content authorization subnetwork of a content distribution network. The computing devices 160*a-d* may be configured to communicate via the internal network 110.

The system 100 may comprise one or more user devices 120. A user device 120 may comprise a gateway, a cable modem, a set-top box, a smart phone, a tablet, a laptop, a desktop, and/or a mobile computing device, as examples. The user device 120 may comprise a computing device configured to access content assets. The user device 120 may be configured to send a request for a content asset. The user device 120 may be configured to send the request based on receiving a user input indicative of the content asset. The user input may comprise a request to start playing the content asset, such as from a beginning of the content asset. The user input may comprise a request to continue playing the content asset, such as from a point in the content asset where playback was paused and/or stopped. The user device 120 may be configured to send the request for the content asset to one or more of the computing devices 160*a-d*. The user device 120 may be configured to send the request for the content asset via the internal network 110.

The system 100 may comprise an external network 130. The external network 130 may comprise a content distribution network. The user device 120 may be configured to communicate with one or more of the computing devices 160*a-d* via the external network 130. For example, the user device 120 may be configured to communicate with the first computing device 160*a* via the external network 130. The user device 120 may be configured to communicate with the fourth computing device 160*d* via the external network 130. The first computing device 160*a* may be configured to send one or more content assets to the user device 120 via the external network 130. The fourth computing device 160*d* may be configured to send data associated with one or more content assets to the user device 120 via the external network 130. The data associated with the one or more content assets may comprise a key, a license, and/or metadata, as examples.

The user device 120 may be configured to send a request for a content asset. The request may comprise a request to access (e.g., receive, output, play, decrypt, decode, etc.) the content asset. The request for the content asset may comprise authentication data, such as such as a token, an address, a username, and/or an account number associated with the user device 120. The user device 120 may be configured to send the request for the content asset via the external network 130. The user device 120 may be configured to send the request for the content asset to the first computing device 160*a*.

The user device 120 may need a license to access the content asset. The license may comprise metadata, such as permissions associated with the content asset. The content asset may be encrypted and the license may comprise a decryption key. The license may comprise playback information. The content asset may be available for a charge. The license may be granted to users and/or user devices that have paid for access to the content asset. The content asset may be available to subscribers of a service. The license may be granted to users and/or user devices that have a subscription to the service.

The user device 120 may be configured to send a request for the license associated with the content asset. The first computing device 160a may be configured to send the request for the license, such as based on receiving the request for the content asset from the user device 120. The request for the license may comprise the authentication data. The user device 120 and/or the first computing device 160a may be configured to send the request for the license associated with the content asset via the internal network 110. The request for the license may be sent to the fourth computing device 160d.

The fourth computing device 160d may be configured to process the license request. In existing DRM processes, there may be a delay in the user device 120 accessing the content asset as a result of processing of the license request. Processing the license request may comprise determining that the user device 120 is a trusted device. Processing the license request may comprise determining that the user device 120 is a secured device. Processing the license request may comprise determining that the user device 120 is authorized to access the content asset. Processing the license request may be based on the authentication data. Processing the license request may comprise determining that the authentication data matches known authentication data associated with a trusted and/or authorized user and/or device.

The first computing device 160a may be configured to determine a time that it will take for the user device 120 to receive the license. The first computing device 160a may be configured to determine the time for the user device to receive the license based on a time for the fourth computing device 160d to process the license request for the content asset for the user device 120. The first computing device 160a may be configured to determine the time to process the license based on current conditions of the internal network 110. The current conditions may comprise congestion of the internal network 110. The current conditions may comprise a bandwidth of the internal network 110. The first computing device 160a may be configured to determine the time to process the license based on current conditions of the fourth computing device 160d. The current conditions may comprise a number of operations being performed by the fourth computing device 160d, as examples. The current conditions may comprise a number of license requests being processed at a same or overlapping time. The current conditions may comprise hardware conditions. Examples of hardware conditions include a device not functioning and/or a speed of a CPU of a device. The hardware conditions may affect a time to process the request.

The first computing device 160a may be configured to determine the time for the user device to receive the license based on historical data. The historical data may comprise previous and/or average times for user devices to receive licenses. The historical data may comprise previous and/or average times to process license requests. The historical data may comprise a previous time and/or an average time for a user device to receive a license under similar conditions to the current condition. The historical data may comprise a previous time and/or an average time to process a license request under similar conditions to the current conditions.

The first computing device 160a may be configured to determine the time for the user device 120 to receive the license based on the time for the computing device 160d to process the license request plus an offset time. The offset time may comprise a predetermined amount of time (e.g., 2 seconds, 3 seconds, etc.). The first computing device may be configured to determine the offset time. The offset time may be associated with sending of the license to the user device, such as via the external network 130. The offset time may be determined based on a current condition of the external network 130, for example. The current condition of the external network may comprise a congestion of the external network 130. The current condition of the external network may comprise a bandwidth of the external network 130.

The first computing device 160a may be configured to determine a portion of the content asset. Determining the portion of the content asset may comprise determining a number of frames, segments, chunks, and/or groups of pictures (GOP) of the content asset, for example. The portion of the content asset may have a playback time and/or a streaming time that is equal to the determined time for the user device 120 to receive the license. The portion of the content asset may have a playback time and/or a streaming time that is equal to the determined time to process the license request. The portion of the content asset may have a playback time and/or a streaming time that is similar to (e.g., within 0-1 seconds, 0-3 seconds, 0-5 seconds, etc.) the determined time for the user device to receive the license and/or the determined time to process the license request. The portion of the content asset may have a size (e.g., file size, time duration, percent of the entire content asset, number of frames, number of packets, etc.) that will take a time equal to send as the determined time for the user device to receive the license and/or to process the license. The portion of the content asset may have a size that will take a time equal to stream as the determined time for the user device to receive the license and/or to process the license.

The first computing device 160a may be configured to send the determined portion of the content asset to the user device 120. The determined portion of the content asset may be sent as in an unsecured format. The unsecured portion of the content asset may comprise a portion of the content asset that is unencrypted. The unsecured portion of the content asset may be partially unencrypted or completely unencrypted. For example, the unsecured portion of the content asset may have at least one layer and/or level of encryption, but may be lacking one or more layers and/or levels of encryption. The unsecured portion of the content asset may comprise a portion of the content asset that does not require validation and/or authentication of a user and/or a device in order to access the portion of the content. For example, the unsecured portion of the content asset may comprise a portion of the content asset that does not require proof of identification, such as a known identification or an authorized identification, of the user and/or the device to access the portion of the content. The unsecured portion of the content asset may comprise a portion of the content asset that does not require decoding and/or decryption to access the portion of the content. The unsecured portion of the content asset may comprise a portion of the content asset that is unmasked. The unsecured portion of the content asset may comprise a portion of the content asset that is sent via an unsecured method. The unsecured method may comprise an unsecured communication session, an unsecured communication protocol, and/or an unsecured network, as examples.

The first computing device 160a may be configured to send the unsecured portion of the content asset 140 via the external network 130. The first computing device 160a may be configured to send the unsecured portion of the content asset 140 for the determined time. The first computing device 160a may be configured to send the unsecured portion of the content asset 140 by streaming the unsecured portion of the content asset 140. The user device 120 may be configured to output the unsecured portion of the content asset 140. As a result of the portion being unsecured, the user device 120 may output the portion before receiving the license. As a result of the portion being unsecured, the user device 120 may output the portion before the license request has been processed and/or while the license request is being processed. As a result of the user device 120 outputting the portion of the content, the delay in the user accessing the content asset is reduced.

The fourth computing device 160d may be configured to generate and/or retrieve the license associated with the content asset for the user device 120. The fourth computing device 160d may be configured to generate and/or retrieve the license based on processing the license request. The fourth computing device 160d may be configured to send the license associated with the content asset to the user device 120. The fourth computing device 160d may be configured to send the license based on processing the license request. The fourth computing device 160d may be configured to send the license via the external network 130. The fourth computing device 160d may be configured to send the license based on processing the license request.

The first computing device 160a may be configured to send another portion of the content asset 150 to the user device 120 in a secured format. The secured portion of the content asset may comprise a portion of the content asset that is encrypted. The secured portion of the content asset may have one or more layers and/or levels of encryption that the unsecured portion of the content did not have. The secured portion of the content asset may comprise a portion of the content asset that requires validation and/or authentication of a user and/or a device in order to access the portion of the content. For example, the secured portion of the content asset may comprise a portion of the content asset that requires proof of identification, such as a known identification or an authorized identification, of the user and/or the device to access the portion of the content. The secured portion of the content asset may comprise a portion of the content asset that requires decoding and/or decryption to access the portion of the content. The secured portion of the content asset may comprise a portion of the content asset that is masked. The secured portion of the content asset may comprise a portion of the content asset that is sent via a secured method. The secured method may comprise a secured communication session, a secured communication protocol, and/or a secured network, as examples.

The first computing device 160a may be configured to send the secured portion of the content asset 150 via the external network 130. The first computing device 160a may be configured to send the secured portion of the content asset 150 based on the determined time elapsing. The first computing device 160a may be configured to send the secured portion of the content asset 150 to the user device 120 by streaming the secured portion of the content asset to the user device 120.

The user device 120 may be configured decrypt the secured portion of the content asset 150. The user device 120 may be configured to decrypt the secured portion of the content asset 150 using data from the license, such as a decryption key. The user device 120 may be configured to output the decrypted portion of the content asset 150. The user device 120 may be configured to output the decrypted portion of the content asset 150 based on the license, such as permissions in the license.

Sending the unsecured portion of the content asset with the size and/or for the time that is based on the determined time for the user device 120 to receive the license has several technical advantages. For example, the size (e.g., file size, time duration, percent of the entire content asset, number of frames, number of packets, etc.) of the portion of the content asset that is sent unsecured may be minimized. For example, the size of the portion of the content asset that is sent unsecured may be the minimum size to enable the user device 120 to output the content asset without significant delay after the requesting of the content asset. The size of the portion of the content asset that is sent unsecured may be the minimum size to enable the user device to output the content asset while the license check is being performed.

Sending the unsecured portion of the content asset with the size and/or for the time that is based on the determined time for the user device 120 to receive the license may enable the user device 120 to output the unsecured portion of the content asset followed by the decrypted portion of the content asset without significant delay in between. From the perspective of the user, the transition between playback of the unsecured portion of the content asset and playback of the decrypted portion of the content asset may be seamless or substantially seamless. From the perspective of the user, playback of the continent asset may appear continuous. For example, there may be little or no buffering or stopping of outputting the content asset caused by transitioning between outputting the unsecured portion of the content asset and the decrypted portion of the content asset.

A first manifest file may be generated. The first manifest file may comprise metadata associated with the unsecured portion of the content asset. For example, the first manifest file may comprise an indication of a storage location of the unsecured portion of the content asset, such as a uniform resource locator (URL), a uniform resource identifier (URI), a uniform resource name (URN), or an identifier of a server storing the unsecured portion of the content asset. The first manifest file may comprise a list of packets of a stream and/or fragments (e.g., 1 second fragments, 2 second fragments, 3 second fragments, etc.) of the unsecured portion of the content asset. The indication of the storage location of the unsecured portion of the content asset may comprise a list of storage locations (e.g., URL's, URI's, URN's, etc.) of the packets and/or fragments of the unsecured portion of the content asset. Requests for the unsecured portion of the content asset, such as the packets and/or fragments of the unsecured portion of the content asset, may be sent to the indicated storage locations. For example, if the packets and/or fragments comprise a portion of the content asset having a duration (e.g., 1 second, 2 seconds, 3 seconds, etc.). Requests may be made at time intervals corresponding to the duration (e.g., every 1 second, 2 seconds, 3 seconds, etc.). For example, if the storage location comprises the first computing device 160a, the user device may send one or more requests for packets and/or fragments of the unsecured portion of the content asset to the first computing device 160a.

The first manifest file may comprise playback information associated with the unsecured portion of the content asset, such as data associated with trickplay features or other output features of the content asset. The first manifest file may be generated by one of the computing devices 160a-d.

For example, the first manifest file may be generated by the first computing device 160a. The first manifest file may be sent to the user device 120. The first manifest file may be sent to the user device 120 before sending the unsecured portion of the content asset to the user device 120. The user device 120 may use the first manifest file to request packets and/or fragments of the unsecured portion of the content asset. For example, if the packets and/or fragments of the unsecured portion of the content asset are stored on the first computing device 160a, the user device 120 may send one or more requests for one or more packets and/or fragments of the unsecured portion of the content asset to the first computing device 160a. The first computing device 160a may send the user device 120 a requested packet and/or fragment based on the request.

A second manifest file may be generated. The second manifest file may comprise metadata associated with the secured portion of the content asset. For example, the second manifest file may comprise an indication of a storage location of the secured portion of the content asset, such as a uniform resource locator (URL), a uniform resource identifier (URI), a uniform resource name (URN), or an identifier of a server storing the secured portion of the content asset. The second manifest file may comprise a list of packets of a stream and/or fragments (e.g., 1 second fragments, 2 second fragments, 3 second fragments, etc.) of the secured portion of the content asset. The indication of the storage location of the secured portion of the content asset may comprise a list of storage locations (e.g., URL's, URI's, URN's, etc.) of the packets and/or fragments of the secured portion of the content asset. Requests for the secured portion of the content asset, such as the packets and/or fragments of the secured portion of the content asset, may be sent to the indicated storage locations. For example, if the packets and/or fragments comprise a portion of the content asset having a duration (e.g., 1 second, 2 seconds, 3 seconds, etc.). Requests may be made at time intervals corresponding to the duration (e.g., every 1 second, 2 seconds, 3 seconds, etc.). For example, if the storage location comprises the first computing device 160a, the user device 120 may send one or more requests for packets and/or fragments of the unsecured portion of the content asset to the first computing device 160a.

The second manifest file may comprise playback information associated with the secured portion of the content asset, such as data associated with trickplay features or other output features of the content asset. The second manifest file may be generated by one of the computing devices 160a-d. For example, the second manifest file may be generated by the first computing device 160a.

The second manifest file may be sent to the user device 120. The second manifest file may be sent to the user device 120 before sending the secured portion of the content asset to the user device 120. For example, the second manifest file may be sent to the user device 120 based on processing the license request and/or based on sending the user device 120 the license. The second manifest file may be sent to the user device 120 before, concurrently, or after sending the license associated with the content asset to the user device 120. The user device 120 may use the second manifest file to request packets and/or fragments of the secured portion of the content asset. For example, if the packets and/or fragments of the secured portion of the content asset are stored on the first computing device 160a, the user device 120 may send one or more requests for one or more packets and/or fragments of the secured portion of the content asset to the first computing device 160a. The first computing device 160a may send the user device 120 a requested packet and/or fragment based on the request. The first computing device 160a may send the user device 120 a requested packet and/or fragment based on the user device 120 having the license.

Figure 2:
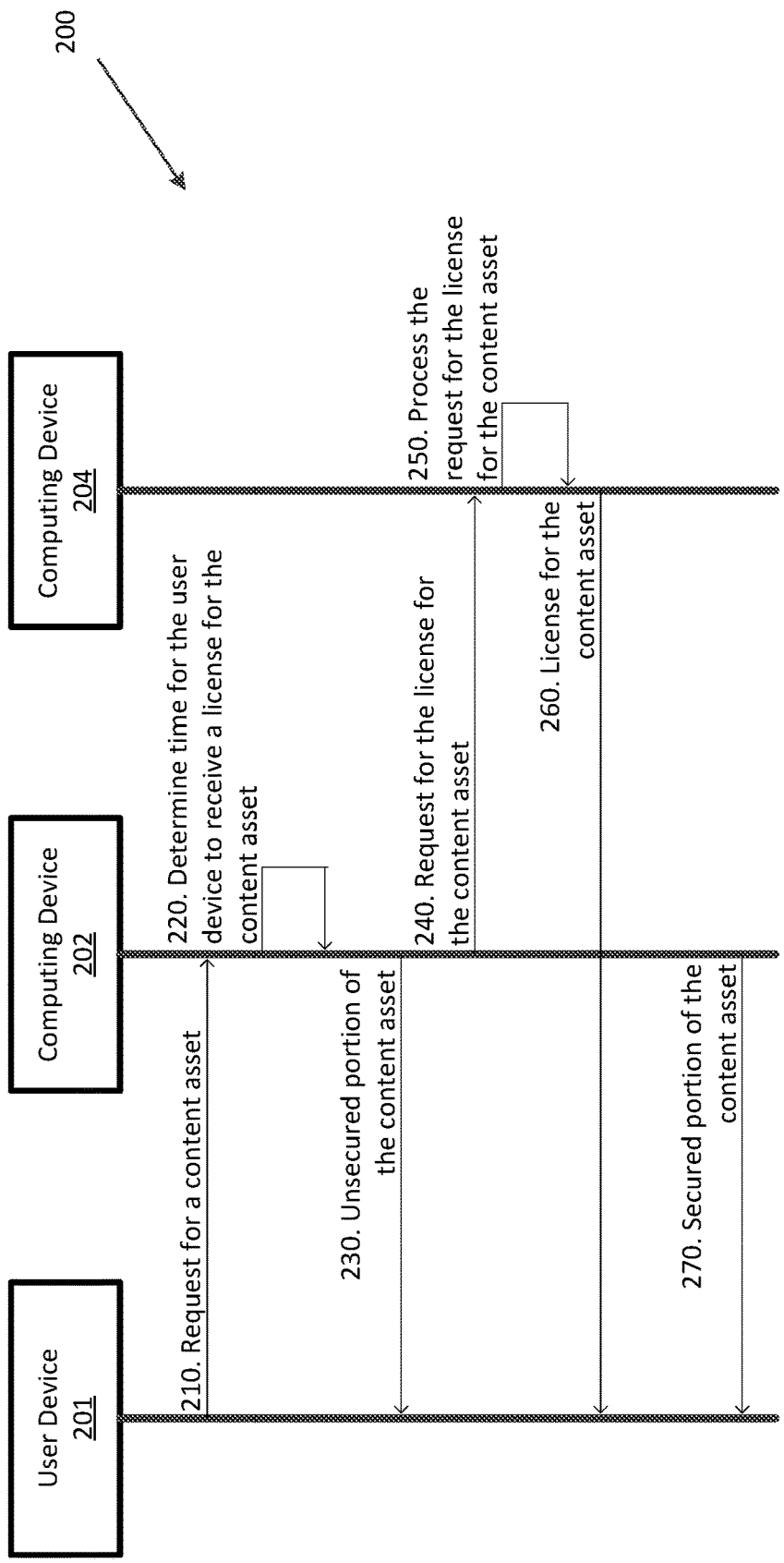
FIG. 2 is a diagram of an example method.

FIG. 2 shows an example method 200. At step 210, a user device 201 (e.g., user device 120 in FIG. 1) may send a request for a content asset. The user device 201 may send the request for the content asset to a first computing device 202 (e.g., one or more of computing devices 160a-d in FIG. 1). The request may comprise a request to play the content asset from a starting point of the content asset, such as a first frame of the content asset. The request may comprise a request to resume play of a paused and/or stopped content asset.

At step 220, the first computing device 202 may determine a time for the user device 201 to receive a license for the content asset. The first computing device 202 may determine the time for the user device 201 to receive the license based on receiving the request for the content asset from the user device 201. The first computing device 202 may determine the time for the user device 201 to receive the license based on receiving a request for the license from the user device 201.

The first computing device 202 may determine the time for the user device 201 to receive the license for the content asset based on a time for a request for the license to be processed, such as by the second computing device 204. The first computing device 202 may determine the time to process the license based on current conditions of an internal network (e.g., internal network 110 in FIG. 1). The current conditions may comprise congestion of the internal network. The current conditions may comprise a bandwidth of the internal network. The first computing device 202 may determine the time to process the license based on current conditions of the second computing device 204. The current conditions may comprise a number of operations being performed by the second computing device 204, as examples. The current conditions may comprise a number of license requests being processed at a same or overlapping time.

The first computing device 202 may determine the time for the user device 201 to receive the license based on historical data. The historical data may comprise previous and/or average times for user devices to receive licenses. The historical data may comprise previous and/or average times to process license requests. The historical data may comprise previous and/or average times for user devices to receive licenses under similar conditions to the current conditions. The historical data may comprise a previous time and/or an average time to process a license request under similar conditions to the current conditions.

The first computing device 202 may determine the time for the user device 201 to receive the license based on the time for the second computing device 204 to process the license request plus an offset time. The offset time may comprise a predetermined amount of time (e.g., 2 seconds, 3 seconds, etc.). The first computing device 202 may determine the offset time. The offset time may be associated with sending of the license to the user device 201, such as via an external network (e.g., external network 130 in FIG. 1). The offset time may be determined based on a current condition of the external network, for example. The current condition of the external network may comprise a congestion of the external network. The current condition of the external network may comprise a bandwidth of the external network.

The first computing device 202 may determine a portion of the content asset. The first computing device 202 may determine the portion of the content asset based on the determined time for the user device 201 to receive the license. Determining the portion of the content asset may comprise determining a number of frames, segments, chunks, and/or groups of pictures (GOP) of the content asset, for example. The portion of the content asset may have a playback time and/or a streaming time that is equal to the determined time for the user device 201 to receive the license and/or the determined time for the second computing device 204 to process the license request. The portion of the content asset may have a playback time and/or a streaming time that is similar to (e.g., within 0-1 seconds, 0-3 seconds, 0-5 seconds, etc.) the determined time for the user device 201 to receive the license and/or the determined time for the second computing device 204 to process the license request. The portion of the content asset may have a size (e.g., file size, time duration, percent of the entire content asset, number of frames, number of packets, etc.) that will take a time equal to the determined time to send, such as a streaming time. The portion of the content asset may have a playback time and/or a streaming time that is equal to or similar to the determined time for the user device 201 to receive the license and/or the determined time for the second computing device 204 to process the license request.

At step 230, the determined portion of the content asset may be sent to the user device 201. The determined portion of the content asset may be sent by the first computing device 202. The determined portion of the content asset may be sent unsecured. The unsecured portion of the content asset may comprise a portion of the content asset that is unencrypted. The unsecured portion of the content asset may have at least one layer and/or level of encryption, but may be lacking one or more layers and/or levels of encryption, such as one or more layers and/or levels of encryption that restrict access to devices having a license. The unsecured portion of the content asset may comprise a portion of the content asset that does not require validation and/or authentication of a user and/or a device in order to access the portion of the content. For example, the unsecured portion of the content asset may comprise a portion of the content asset that does not require proof of identification, such as a known identification or an authorized identification, of the user and/or the device to access the portion of the content. The unsecured portion of the content asset may comprise a portion of the content asset that does not require decoding and/or decryption to access the portion of the content.

Sending the determined portion of the content asset may comprise streaming the determined portion of the content asset. Sending the determined portion of the content asset may comprise streaming the determined portion of the content for a time period equal to or similar to the determined time for the user device 201 to receive the license and/or the determined time for the second computing device 204 to process the license request.

A first manifest file may be sent to the user device 201. The first manifest file may be sent by the first computing device 202. The first manifest file may comprise metadata associated with the unsecured portion of the content asset. For example, the first manifest file may comprise an indication of a storage location of the unsecured portion of the content asset, such as a uniform resource locator (URL), a uniform resource identifier (URI), a uniform resource name (URN), or an identifier of a server storing the unsecured portion of the content asset. The first manifest file may comprise a list of packets of a stream of the unsecured portion of the content asset. The first manifest file may comprise playback information associated with the unsecured portion of the content asset, such as data associated with trickplay features or other output features of the content asset.

At step 240, a request for the license for the content asset may be sent to the second computing device 204. The request for the license may be sent by the first computing device 202. The request for the license may be sent by the user device 201. The request for the license may be sent based on the request for the content asset.

At step 250, the second computing device 204 may process the request for the license for the content asset. Processing the license request may comprise determining that the user device 201 is a trusted device. Processing the license request may comprise determining that the user device 201 is a secured device. Processing the license request may comprise determining that the user device 201 is authorized to access the content asset. Processing the license request may be based on the authentication data. Processing the license request may comprise determining that the authentication data matches known authentication data associated with a trusted and/or authorized user and/or user device.

At step 260, the license for the content asset may be sent. The license for the content asset may be sent by the second computing device 204. The license for the content asset may be sent by the first computing device 202, such as based on receiving the license from the second computing device 204. The license for the content asset may be sent to the user device 201. The license for the content asset may be sent based on processing the request for the license for the content asset. The license may comprise metadata, such as permissions associated with the content asset. The license may comprise a decryption key. The license may comprise playback information.

At step 270, a secured portion of the content asset may be sent to the user device 201. The secured portion of the content asset may comprise a portion of the content asset that is encrypted. The secured portion of the content asset may have one or more layers and/or levels of encryption that the unsecured portion of the content did not have, such as one or more layers and/or levels of encryption that restrict access to devices having a license. The secured portion of the content asset may comprise a portion of the content asset that requires validation and/or authentication of a user and/or a device in order to access the portion of the content. For example, the secured portion of the content asset may comprise a portion of the content asset that requires proof of identification, such as a known identification or an authorized identification, of the user and/or the device to access the portion of the content. The secured portion of the content asset may comprise a portion of the content asset requires decoding and/or decryption to access the portion of the content. The secured portion of the content asset may comprise a portion of the content asset that is masked.

The secured portion of the content asset may be sent by the first computing device 202. The first computing device 202 may cause another computing device to send the secured portion of the content asset to the user device 201. Sending the secured portion of the content asset may comprise streaming the secured portion of the content asset. The secured portion of the content asset may be sent to the user device 201 based on the license request being processed. The secured portion of the content asset may be sent to the user device 201 based on the time to process the license request determined in step 220 elapsing. The secured portion of the content asset may comprise a portion of the content asset that follows the portion of the content asset sent in step

230, such as one or more frames that come after the one or more frames of the first portion in an order of the frames.

A second manifest file may be sent to the user device 201. The second manifest file may comprise metadata associated with the secured portion of the content asset. For example, the second manifest file may comprise an indication of a storage location of the secured portion of the content asset, such as a uniform resource locator (URL), a uniform resource identifier (URI), a uniform resource name (URN), or an identifier of a server storing the secured portion of the content asset. The second manifest file may comprise a list of packets of a stream of the secured portion of the content asset. The second manifest file may comprise playback information associated with the secured portion of the content asset, such as data associated with trickplay features or other output features of the content asset.

For example, a user may be scrolling through a menu of shows on a television. The user may select a show to watch. The television or another device in communication with the television, such as a set-top box, may send a request for the selected show to a content server. The show may be part of a subscription-based package. Content in the subscription-based package may require a license for viewing.

The content server may send a request for the license to a license server. The content server may determine that it will take approximately 5 minutes a license to be processed for the show for the television or other device. The content server may determine the time to process the license based on current congestion of an internal network (e.g., a network of devices configured to handle content requests), bandwidth of the internal network, number of operations being performed by the content server, number of license requests being processed, and/or historical data.

The content server may determine that it will take approximately the time to process the license plus an offset time for the television or other device to receive the license. The offset time may comprise a predetermined value. The content server may determine the offset time, such as based on a condition of an external network (e.g., a network used by the television or other device and the content server to communicate). The offset time may comprise 1 minute.

The content server may determine an unsecured portion of the show (e.g., a portion size, a number of frames, a number of packets, etc.) that has a playback time, 6 seconds, equal to the time the process the license plus of 5 minutes plus the offset time of 1 minute. The content server may generate a first manifest file. The first manifest file may comprise an indication of a storage locations (e.g., a URL, a URI, a URN, etc.) of the determined unsecured portion of the show and trickplay features associated with playback of the determined unsecured portion of the show. The content server may send the first manifest file to the television or other device. The television or other device may download the unsecured portion of the show from the storage locations. The television or other device may output the unsecured portion of the show, such as without having to decrypt the unsecured portion of the show.

The license server may determine that an account associated with the television or other device has a subscription to the package with the show. Based on the account having the subscription, the license server may send the license to the content server. The license may comprise a decryption key.

Based on receiving the license, the content server may generate a second manifest file. The second manifest file may comprise an indication of storage locations of a secured portion of the show. The secure portion of the show may comprise a portion of the show that is configured to be played after the portion of the show in the unsecured format. The secured portion of the show may have one or more layers of encryption that the unsecured portion did not have. The secured portion of the show may only be accessed using the decryption key from the license.

The content server may send the license and the second manifest file to the television or other device. The television or other device may download the secured portion of the show from the storage location. The television or other device may decrypt the secured portion of the show using the decryption key. The television or other device may output the secured portion of the show.

Figure 3:
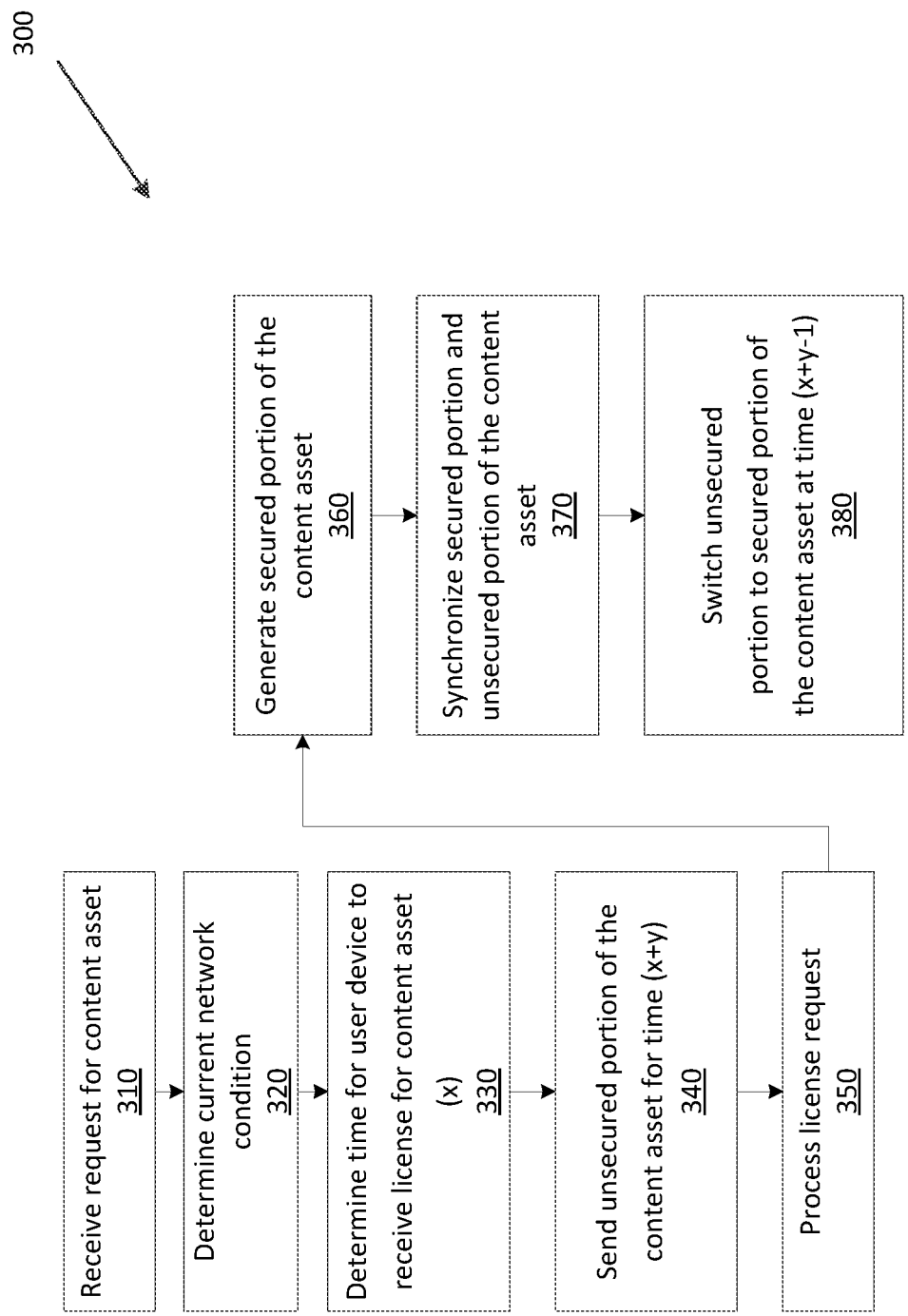
FIG. 3 is a diagram of an example method.

FIG. 3 shows an example method 300. At step 310, a request for a content asset may be received. The request may comprise a request to access the content asset. The request may be received from a user device (e.g., user device 120 in FIG. 1, user device 201 in FIG. 2). The request may be received by a computing device (e.g., one or more of computing devices 160a-d in FIG. 1, computing device 202 in FIG. 2). The request may comprise a request to play the content asset from a starting point of the content asset, such as a first frame of the content asset. The request may comprise a request to resume play of a paused and/or stopped content asset.

The request for the content asset may comprise a request for a license for the content asset. The license may comprise metadata, such as permissions associated with the content asset. The content asset may be decrypted and the license may comprise a decryption key. The license may comprise playback information. The content asset may be available for a charge. The license may be granted to users and/or user devices that have paid for access to the content asset. The content asset may be available to subscribers of a service. The license may be granted to users and/or user devices that have a subscription to the service.

At step 320, a current condition associated with a network may be determined. The current condition of the network may be determined by the computing device. The network may comprise a network used by one or more computing devices to communicate (e.g., internal network 110 in FIG. 1). The network may comprise a network used by one or more computing devices to communicate with the user device (e.g., external network 130 in FIG. 1). The current condition may comprise congestion of the network. The current condition may comprise bandwidth of the network. The current condition may comprise a number of license requests received and/or being processed. A current condition associated with one or more of the computing devices may be determined. The current condition may comprise a number of operations being executed by the computing device.

At step 330, a time for the user device to receive a license for the content asset may be determined. The time may be represented by a value "x". The value "x" may be a number representing a unit of time, such as seconds, milliseconds, etc. The time for the user device to receive the license may be determined by the computing device. The time for the user device to receive the license may be based on receiving the request for the content asset from the user device. The time for the user device to receive the license may be based on receiving a request for the license from the user device.

The time for the user device to receive the license may be determined based on a time for a request for the license to be processed. The time for the license request to be processed may be determined based on one or more conditions of the computing device that is processing the license request. The conditions may comprise how many (e.g., a count) operations are currently being performed by the computing device. The conditions may comprise how many (e.g., a count) license requests are currently being processed.

The time for the user device to receive the license may be based on one or more current conditions of a network (e.g., internal network 110 in FIG. 1, external network 130 in FIG. 1), such as a network used by the user device, the first computing device, and/or the second computing device. The conditions of the network may comprise current congestion of the network. The conditions of the network may comprise a current bandwidth of the network.

The time for the user device to receive the license may be based on historical data. The historical data may comprise previous and/or average times for user devices to receive licenses. The historical data may comprise previous and/or average times to process license requests. The historical data may comprise previous and/or average times for user devices to receive licenses under similar conditions to the current conditions. The historical data may comprise a previous time and/or an average time to process a license request under similar conditions to the current conditions.

A portion of the content asset may be determined. The portion of the content asset may be determined based on the determined time for the user device to receive the license. Determining the portion of the content asset may comprise determining a number of frames, segments, chunks, and/or groups of pictures (GOP) of the content asset, for example. The portion of the content asset may have a playback time and/or a streaming time that is equal to the determined time for the user device to receive the license and/or the determined time for the second computing device to process the license request. The portion of the content asset may have a playback time and/or a streaming time that is similar to (e.g., within 0-1 seconds, 0-3 seconds, 0-5 seconds, etc.) the determined time "x" for the user device to receive the license and/or the determined time for the second computing device to process the license request. The portion of the content asset may have a playback time and/or a streaming time that is similar to (e.g., within 0-1 seconds, 0-3 seconds, 0-5 seconds, etc.) the determined time "x" for the user device to receive the license. The portion of the content asset may have a playback time and/or a streaming time "x" that is equal to or similar to the determined time for the user device to receive the license plus an offset time "y". The offset time "y" may comprise a predetermined amount of time (e.g., 2 seconds, 3 seconds, etc.). The offset time "y" may be determined based on a current condition of the network, for example. The offset time "y" may be associated with the time to send the license to the user device.

The portion of the content asset may have a size that will take a time equal to the determined time to send, such as a streaming time. The portion of the content asset may have a playback time and/or a streaming time that is equal to or similar to the determined time for the user device to receive the license and/or the determined time for the second computing device to process the license request At step 340, an unsecured portion of the content asset may be sent to the user device. The unsecured portion of the content asset may be sent by the computing device. The unsecured portion of the content asset may comprise the determined portion of the content asset. The portion of the content asset may have a playback time and/or a streaming time that is equal to the determined time "x" for the user device to receive the license. The unsecured portion of the content asset may be sent to the user device for a predetermined time. For example, the unsecured portion of the content asset may be streamed to the user device for the predetermined time. The predetermined time may comprise the determined time "x" for the user device to receive the license. The predetermined time may comprise the determined time to process the license request "x" plus the offset time "y."

At step 350, the request for the license for the content asset for the user device may be processed. One or more of the computing devices may process the license request. Processing the license request may comprise determining that the user device is a trusted device. Processing the license request may comprise determining that the user device is a secured device. Processing the license request may comprise determining that the user device is authorized to access the content asset. Processing the license request may be based on the authentication data. Processing the license request may comprise determining that the authentication data matches known authentication data associated with a trusted and/or authorized user and/or user device.

At step 360, a secured portion of the content asset may be generated. The secured portion of the content asset may comprise a portion of the content asset that is encrypted. The secured portion of the content asset may have one or more layers and/or levels of encryption that the unsecured portion of the content did not have, such as one or more layers and/or levels of encryption that restrict access to devices having a license. The secured portion of the content asset may comprise a portion of the content asset that requires validation and/or authentication of a user and/or a device in order to access the portion of the content. For example, the secured portion of the content asset may comprise a portion of the content asset that requires proof of identification, such as a known identification or an authorized identification, of the user and/or the device to access the portion of the content. The secured portion of the content asset may comprise a portion of the content asset requires decoding and/or decryption to access the portion of the content. The secured portion of the content asset may comprise a portion of the content asset that is masked.

One or more of the computing devices may generate the secured portion of the content asset. The secured portion of the content asset may be generated based on processing the license request. Generating the secured portion of the content asset may comprise encrypting a portion of the content asset. The secured portion of the content asset may comprise a portion of the content asset that follows the unsecured portion of the content asset, such as one or more frames that come after the one or more frames of the first portion in an order of the frames.

At step 370, the secured portion of the content asset may be synchronized with the unsecured portion of the content asset. Synchronizing the secured portion of the content asset and the unsecured portion of the content may comprise determining a segment "x" of unsecure content. The user device may determine the "x" segment. The "x" segment may be currently output. The "x" segment may be determined based on receiving the license. Synchronizing the portions of the content may comprise obtaining a segment "x+1" of the secured content. The "x+1" segment may be output after the "x" segment is output, such as by the user device. One of the computing devices may synchronize the secured portion of the content asset and the unsecured portion of the content asset.

At step 380, the unsecured portion of the content asset may be switched with the secured portion of the content asset. One of the computing devices may switch the unsecured portion of the content asset with the secured portion of the content asset. Switching the unsecured portion of the content asset with the secured portion of the content asset may comprise terminating access to the unsecured content. For example, a device may cease to provide access to the device. The user device may stop requesting the unsecured content. The user device may purge unsecured content stored to the user device. The user device may output the secured content.

The unsecured portion of the content asset may be switched with the secured portion of the content asset at a time indicated by a switch value. The switch value may be a number representing a unit of time, such as seconds, milliseconds, etc. The time indicated by the switch value may be the switch value. The switch value may be a number representing a unit of video, such as segments, chunks, frames, group of pictures (GOP), etc. The time indicated by the switch value may be a runtime associated with the switch value. The switch value may be greater than the value "x", but less than "x" plus the first additional value. Based on the first additional value being 2, the switch value may be x+1.

For example, a user may try to play a movie from an online streaming service on a laptop computer. The laptop computer may send a request for the selected movie to a server. Content offered by the streaming service may be available for a cost. A license for the content may be issued based on payment of the cost. The laptop computer may send payment information to the server.

The server may determine a time that it will take to process the license for the movie for the laptop computer. The time may be based on a number of other licenses being processed, a time to process the payment, current congestion of an internal network (e.g., a network of devices associated with the streaming service), bandwidth of the internal network, number of operations being performed by the server, and/or historical data.

The server may determine that it will take approximately the time to process the license plus an offset time for the laptop to receive the license. The offset time may comprise a predetermined value. The server may determine the offset time, such as based on a condition of an external network (e.g., a network used by the laptop and the server to communicate).

The server may determine an unsecured portion of the movie (e.g., a portion size, a number of frames, a number of packets, etc.) that has a playback time equal to the time the process the license plus the offset time. The server may generate a first manifest file. The first manifest file may comprise an indication of a storage locations (e.g., a URL, a URI, a URN, etc.) of the determined unsecured portion of the movie and trickplay features associated with playback of the determined unsecured portion of the movie. The server may send the first manifest file to the laptop. The laptop may download the unsecured portion of the content from the storage locations. The laptop may output the unsecured portion of the content, such as without having to decrypt the unsecured portion of the content.

The server may determine that the laptop is in a geographic location in which the movie is available. Based on determining that the laptop is in the authorized geographic location, the server may process the payment information. Based on processing the payment information, the server may generate a license for the movie for the laptop. The license may comprise a decryption key.

Based on processing the payment information, the server may generate a second manifest file. The second manifest file may comprise an indication of storage locations of a secured portion of the movie. The secure portion of the movie may comprise a portion of the movie that is configured to be played after the portion of the movie in the unsecured format. The secured portion of the movie may have one or more layers of encryption that the unsecured portion did not have. The secured portion of the movie may only be accessed using the decryption key from the license.

The server may send the license and the second manifest file to the laptop. Based on receiving the second manifest file, the laptop may switch from using the first manifest file to using the second manifest file. Based on receiving the second manifest file, the laptop may stop downloading the unsecured portion of the movie and may start downloading the secured portion of the movie from the storage location. The laptop may decrypt the secured portion of the content using the decryption key. The laptop may output the secured portion of the movie.

Figure 4:
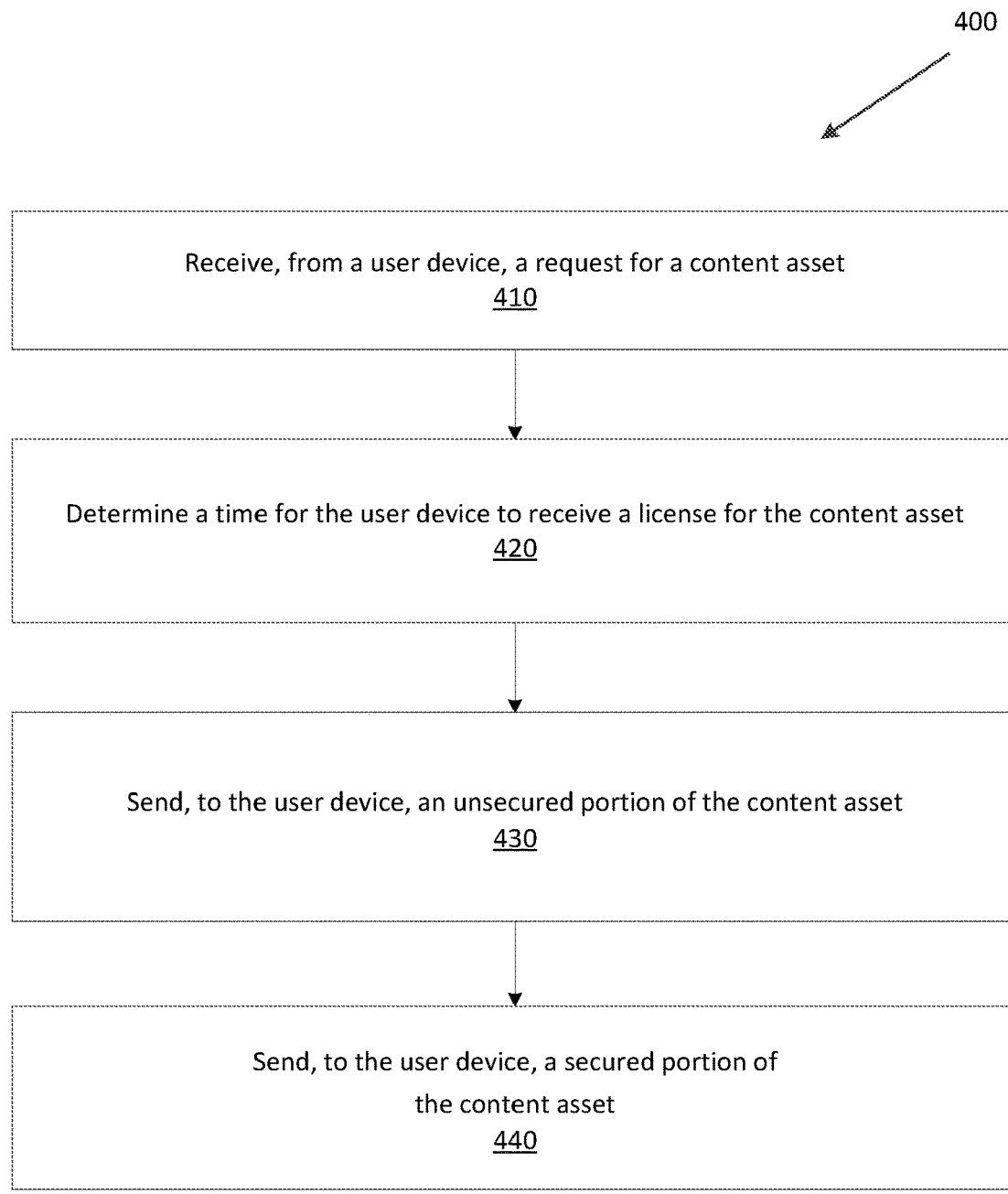
FIG. 4 is a diagram of an example method.

FIG. 4 shows an example method. At step 410, a request for a content asset may be received. The request for the content asset may be received from a user device (e.g., user device 120 in FIG. 1, user device 201 in FIG. 2). The request for the content asset may be received by a computing device (e.g., one or more of computing devices 160a-d in FIG. 1, computing device 202 in FIG. 2). The request may comprise a request to play the content asset from a starting point of the content asset, such as a first frame of the content asset. The request may comprise a request to resume play of a paused and/or stopped content asset.

The request for the content asset may comprise a request for a license for the content asset. The license may comprise metadata, such as permissions associated with the content asset. The content asset may be decrypted and the license may comprise a decryption key. The license may comprise playback information. The content asset may be available for a charge. The license may be granted to users and/or user devices that have paid for access to the content asset. The content asset may be available to subscribers of a service. The license may be granted to users and/or user devices that have a subscription to the service.

At step 420, a determined time for the user device to receive the requested license may be determined. The time for the user device to receive the license may be determined based on receiving the request for the content asset from the user device. The time for the user device to receive the license may be determined based on receiving a request for the license from the user device.

The time for the user device to receive the license may be determined based on a time for a request for the license to be processed. The time for the license request to be processed may be determined based on current conditions of an internal network (e.g., internal network 110 in FIG. 1). The current conditions may comprise congestion of the internal network. The current conditions may comprise a bandwidth of the internal network. The time for the license request to be processed may be determined based on current conditions of the computing device processing the license request. The current conditions may comprise a number of operations being performed by the computing device, as examples. The current conditions may comprise a number of license requests being processed at a same or overlapping time.

The time for the user device to receive the license may be determined based on historical data. The historical data may comprise previous and/or average times for user devices to receive licenses. The historical data may comprise previous and/or average times to process license requests. The historical data may comprise previous and/or average times for user devices to receive licenses under similar conditions to the current conditions. The historical data may comprise a previous time and/or an average time to process a license request under similar conditions to the current conditions.

The time for the user device to receive the license may be determined based on the time for the computing dev ice to process the license request plus an offset time. The offset time may comprise a predetermined amount of time (e.g., 2 seconds, 3 seconds, etc.). The offset time may be determined. The offset time may be associated with sending of the license to the user device, such as via an external network (e.g., external network 130 in FIG. 1). The offset time may be determined based on a current condition of the external network, for example. The current condition of the external network may comprise a congestion of the external network. The current condition of the external network may comprise a bandwidth of the external network. The offset may be determined based on a current condition of the computing device processing the license request.

A portion of the content asset may be determined. The portion of the content asset may be determined based on the determined time for the user device to receive the license. Determining the portion of the content asset may comprise determining a number of frames, segments, chunks, and/or groups of pictures (GOP) of the content asset, for example. The portion of the content asset may have a playback time and/or a streaming time that is equal to the determined time for the user device to receive the license and/or the determined time for the computing device to process the license request. The portion of the content asset may have a playback time and/or a streaming time that is similar to (e.g., within 0-1 seconds, 0-3 seconds, 0-5 seconds, etc.) the determined time for the user device to receive the license and/or the determined time for the computing device to process the license request. The portion of the content asset may have a size that will take a time equal to the determined time to send, such as a streaming time. The portion of the content asset may have a playback time and/or a streaming time that is equal to or similar to the determined time for the user device to receive the license and/or the determined time for the computing device to process the license request.

At step 430, the determined portion of the content asset may be sent. The determined portion of the content asset may be sent unsecured. The unsecured portion of the content asset may comprise a portion of the content asset that is unencrypted. The unsecured portion of the content asset may have at least one layer and/or level of encryption, but may be lacking one or more layers and/or levels of encryption, such as one or more layers and/or levels of encryption that restrict access to devices having a license. The unsecured portion of the content asset may comprise a portion of the content asset that does not require validation and/or authentication of a user and/or a device in order to access the portion of the content. For example, the unsecured portion of the content asset may comprise a portion of the content asset that does not require proof of identification, such as a known identification or an authorized identification, of the user and/or the device to access the portion of the content. The unsecured portion of the content asset may comprise a portion of the content asset that does not require decoding and/or decryption to access the portion of the content.

Sending the determined portion of the content asset may comprise streaming the determined portion of the content asset. Sending the determined portion of the content asset may comprise streaming the determined portion of the content for a time period equal to or similar to the determined time for the user device to receive the license and/or the determined time for the computing device to process the license request.

A first manifest file may be sent. The first manifest file may comprise metadata associated with the unsecured portion of the content asset. For example, the first manifest file may comprise an indication of a storage location of the unsecured portion of the content asset, such as a uniform resource locator (URL), a uniform resource identifier (URI), a uniform resource name (URN), or an identifier of a server storing the unsecured portion of the content asset. The first manifest file may comprise a list of packets of a stream of the unsecured portion of the content asset. The first manifest file may comprise playback information associated with the unsecured portion of the content asset, such as data associated with trickplay features or other output features of the content asset.

At step 440, a secured portion of the content asset may be sent. The secured portion of the content asset may comprise a portion of the content asset that is encrypted. The secured portion of the content asset may have one or more layers and/or levels of encryption that the unsecured portion of the content did not have, such as one or more layers and/or levels of encryption that restrict access to devices having a license. The secured portion of the content asset may comprise a portion of the content asset that requires validation and/or authentication of a user and/or a device in order to access the portion of the content. For example, the secured portion of the content asset may comprise a portion of the content asset that requires proof of identification, such as a known identification or an authorized identification, of the user and/or the device to access the portion of the content. The secured portion of the content asset may comprise a portion of the content asset requires decoding and/or decryption to access the portion of the content. The secured portion of the content asset may comprise a portion of the content asset that is masked.

Sending the secured portion of the content asset may comprise streaming the secured portion of the content asset. The secured portion of the content asset may be sent to the user device based on the license request being processed. The secured portion of the content asset may be sent to the user device based on the time to process the license request elapsing. The secured portion of the content asset may comprise a portion of the content asset that follows the portion of the content asset sent in step 430, such as one or more frames that come after the one or more frames of the first portion in an order of the frames. The license may be sent to the user device.

A second manifest file may be sent to the user device. The second manifest file may comprise metadata associated with the secured portion of the content asset. For example, the second manifest file may comprise an indication of a storage location of the secured portion of the content asset, such as a uniform resource locator (URL), a uniform resource identifier (URI), a uniform resource name (URN), or an identifier of a server storing the secured portion of the content asset. The second manifest file may comprise a list of packets of a stream of the secured portion of the content asset. The second manifest file may comprise playback information associated with the secured portion of the content asset, such as data associated with trickplay features or other output features of the content asset.

For example, a subscriber of a content provider's service may select a movie to watch using a remote control in communication with a set-top box. The set-top box may request the selected movie from a video on-demand server via a content distribution network. The content provider may protect access to movies on the video on-demand server with a digital rights management (DRM) system. The video on-demand server may send a request for a DRM license associated with the movie to a license server via an internal network. The video on-demand server may determine current conditions of the internal network and/or the content distribution network. The video on-demand server may determine a time based on the observed conditions. The video on-demand server may determine a size (e.g., length, etc.) of a portion of the movie based on the determined time.

The video on-demand server may prepare a first version of the movie of the determined size. The first version of the movie may be accessed without the DRM license. The video on-demand server may send the first version of the movie to the set-top box. The license server may prepare the DRM license. The set-top box may receive the DRM license from the license server. The video on-demand server may prepare a second version of the movie and synchronize the first version of the movie and the second version of the movie. The video on-demand server may send the second version of the movie to the set-top box. The set-top box may use the DRM license to access the second version of the movie. The video on-demand server may stop sending the first version of the movie based on the portion of the movie ending.

A subscriber of a content provider's service may select a show to watch on a smart phone. The subscriber may pause the show. The subscriber may request resumed play of the show. The content provider may protect access to shows on the video on-demand server with a digital rights management (DRM) system. The smart phone may send a request to resume the show and a request for a DRM license associated with the show to a video on-demand server via a content distribution network. The video on-demand server may send the request for the DRM license associated with the show to a license server via an internal network. The video on-demand server may determine current conditions of the internal network and/or the content distribution network. The video on-demand server may determine a time based on the observed conditions. The video on-demand server may determine a size (e.g., length, etc.) of a portion of the show based on the determined time.

The video on-demand server may prepare a first version of the show of the determined size. The first version of the show may be accessed without the DRM license. The video on-demand server may send the first version of the show to the smart phone. The license server may prepare the DRM license. The smart phone may receive the DRM license from the license server. The video on-demand server may prepare a second version of the show and synchronize the first version of the show and the second version of the show. The video on-demand server may stop sending the first version of the show. The video on-demand server may send the second version of the show to the smart phone. The smart phone may use the DRM license to access the second version of the show.

For example, a user may attempt to watch a video on a mobile phone. The video may only be available to users who have an account with a service. The phone may send a request for the video to a server. The video may be available for viewing on a pay-per-view service. The request may comprise a username and password of an account of the user for the service.

The server may determine a time that it will take to process a license for the video for the phone. The time may be based on a number of other licenses being processed, current congestion of an internal network (e.g., a network of devices associated with the service), bandwidth of the internal network, number of operations being performed by the server, and/or historical data.

The server may determine that it will take approximately the time to process the license plus an offset time for the phone to receive the license. The offset time may comprise a predetermined value. The server may determine the offset time, such as based on a condition of an external network (e.g., a network used by the phone to communicate).

The server may determine an unsecured portion of the video (e.g., a portion size, a number of frames, a number of packets, etc.) that has a playback time equal to the time the process the license plus. The unsecured portion of the video may comprise a portion of the video that is available to the public, such as to viewers that do not have accounts with the service.

The server may generate a first manifest file. The first manifest file may comprise an indication of a storage locations (e.g., a URL, a URI, a URN, etc.) of the determined unsecured portion of the video and trickplay features associated with playback of the determined unsecured portion of the video. The server may send the first manifest file to the phone. The phone may download the unsecured portion of the content from the storage locations. The phone may output the unsecured portion of the content, such as without having to decrypt the unsecured portion of the content.

Based on determining that the username and password of the user is associated with an account for the service, the server may generate a license. The server may generate a second manifest file. The second manifest file may comprise an indication of storage locations of a secured portion of the video. The secure portion of the video may comprise a portion of the video that is configured to be played after the portion of the video in the unsecured format. The secured portion of the video may comprise a portion that only users having accounts with the service are authorized to view.

The server may send the license and the second manifest file to the phone. Based on receiving the second manifest file, the phone may switch from using the first manifest file to using the second manifest file. Based on receiving the second manifest file, the phone may stop downloading the unsecured portion of the video and may start downloading the secured portion of the video from the storage location. The phone may output the secured portion of the video.

Figure 5:
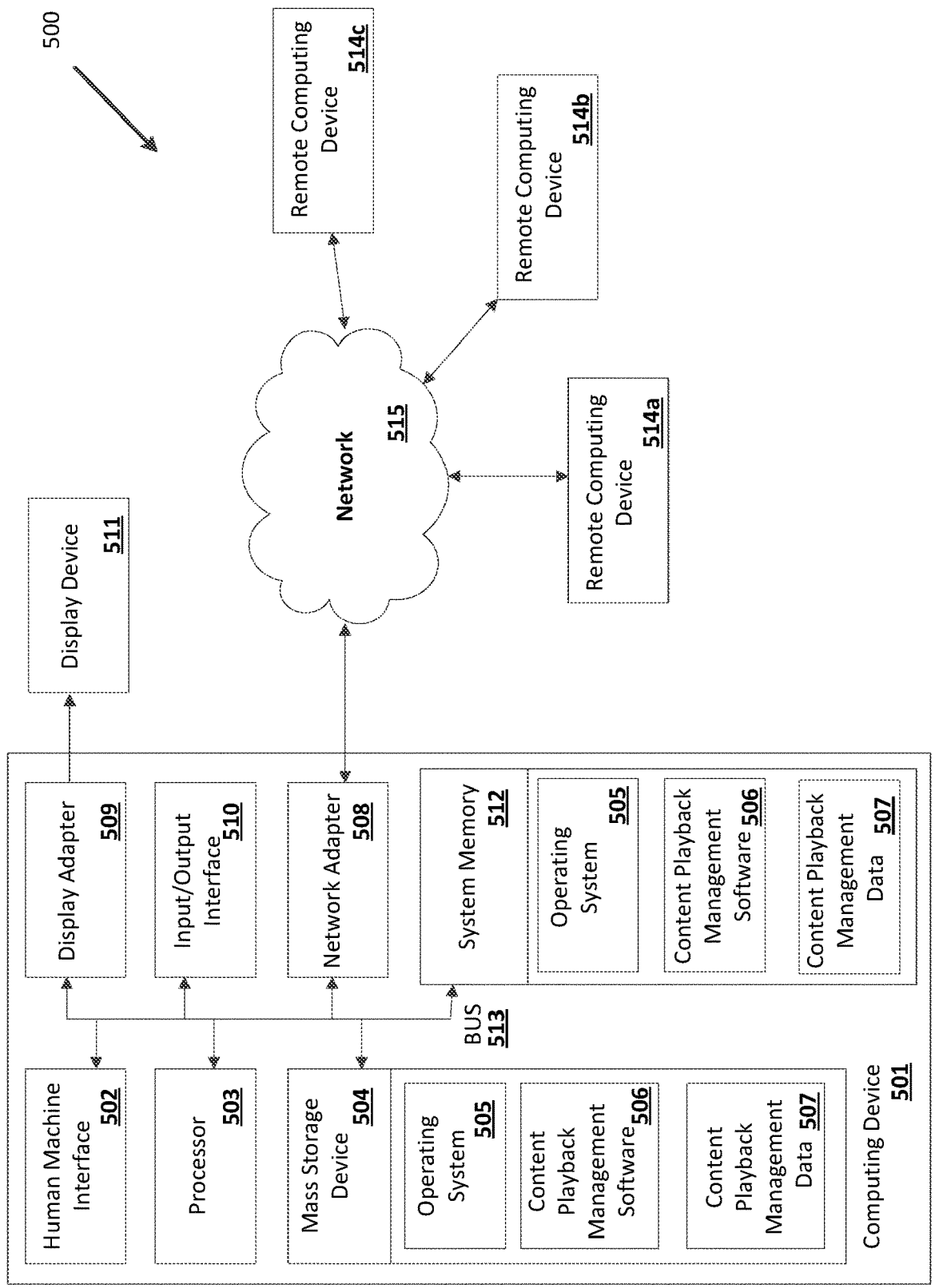
FIG. 5 is a diagram of an example system.

FIG. 5 shows an example system 500. The system 500 may comprise a computing device 501. The computing device 501 may comprise one or more of computing devices 160a-d from FIG. 1, the user device 120 from FIG. 1, the user device 201 from FIG. 2, and/or computing devices 202 and 204 from FIG. 2. The computing device 501 may comprise a system bus 513. The system bus 513 may comprise one or more bus structures, including a memory bus or memory controller, a peripheral bus, an accelerated graphics port, and a processor or local bus using any of a variety of bus architectures. The architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description may also be implemented over a wired or wireless network connection and each of the subsystems, including the processor 503, a mass storage device 504, an operating system 505, content playback management software 506, content playback management data 507, a network adapter 508, system memory 512, an Input/Output Interface 510, a display adapter 509, a display device 511, and a human machine interface 502, may be contained within one or more remote computing devices 514a,b,c at physically separate locations, connected through buses of this form, in effect implementing a fully distributed system.

The computing device 501 may comprise a variety of computer readable media. Exemplary readable media may be any available media that is accessible by the computing device 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 may store data such as content playback management data 507 and/or program modules such as operating system 505 and content playback management software 506 that are immediately accessible to and/or are presently operated on by the processing unit 503.

The computing device 501 may comprise other removable/non-removable, volatile/non-volatile computer storage media. FIG. 5 shows a mass storage device 504 which may provide non-volatile storage of computer code, computer readable instructions, data structures, program modules, and other data for the computing device 501. For example and not meant to be limiting, a mass storage device 504 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 504, including for example, an operating system 505 and content playback management software 506. Each of the operating system 505 and content playback management software 506 (or some combination thereof) may comprise elements of the programming and the content playback management software 506. Content playback management data 507 may also be stored on the mass storage device 504. Content playback management data 507 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 501 via an input device (not shown). Examples of such input devices comprise, but are not limited to, a keyboard, a pointing device (e.g., a "mouse"), a microphone, a joystick, a scanner, tactile input devices such as gloves, and other body coverings, and the like. These and other input devices may be connected to the processing unit 503 via a human machine interface 502 that is coupled to the system bus 513, but may be connected by other interface and bus structures, such as a parallel port, game port, an IEEE 1394 Port (also known as a Firewire port), a serial port, or a universal serial bus (USB).

A display device 511 may also be connected to the system bus 513 via an interface, such as a display adapter 509. It is contemplated that the computing device 501 may have more than one display adapter 509 and the computing device 501 may have more than one display device 511. For example, a display device may be a monitor, an LCD (Liquid Crystal Display), or a projector. In addition to the display device 511, other output peripheral devices may comprise components such as speakers (not shown) and a printer (not shown) which may be connected to the computing device 501 via Input/Output Interface 510. Any step and/or result of the methods may be output in any form to an output device. Such output may be any form of visual representation, including, but not limited to, textual, graphical, animation, audio, tactile, and the like. The display 511 and computing device 501 may be part of one device, or separate devices.

The computing device 501 may operate in a networked environment using logical connections to one or more remote computing devices 514a,b,c. The remote computing devices 514a,b,c, may comprise one or more of computing devices 160a-d from FIG. 1, the user device 120 from FIG. 1, the user device 201 from FIG. 2, and/or computing devices 202 and 204 from FIG. 2. A remote computing device may be a personal computer, portable computer, a smart phone, a server, a router, a network computer, a peer device or other common network node, and so on. Logical connections between the computing device 501 and a remote computing device 514a,b,c may be made via a network 515, such as a local area network (LAN) and a general wide area network (WAN). Such network connections may be through a network adapter 508. A network adapter 508 may be implemented in both wired and wireless environments. Such networking environments are conventional and commonplace in dwellings, offices, enterprise-wide computer networks, intranets, and the Internet.

Application programs and other executable program components such as the operating system 505 are shown herein as discrete blocks, although it is recognized that such programs and components reside at various times in different storage components of the computing device 501, and are executed by the data processor(s) of the computer. An implementation of content playback management software 506 may be stored on or sent across some form of computer readable media. Any of the disclosed methods may be performed by computer readable instructions embodied on computer readable media. Computer readable media may be any available media that may be accessed by a computer. For example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed:
1. A method comprising:
receiving, from a user device, a request for a content asset;
determining an expected time associated with processing a license associated with the content asset for the user device;
sending, to the user device, an unsecured portion of the content asset, wherein a size of the unsecured portion of the content asset is based on the determined expected time; and
sending, after processing the license, a secured portion of the content asset.

2. The method of claim 1, wherein the determining the expected time associated with processing the license is at least based on an expected time associated with the user device receiving the license.

3. The method of claim 1, wherein the determining the expected time associated with processing the license is at least based on a condition of a network.

4. The method of claim 1, wherein the determining the expected time associated with processing the license is at least based on a quantity of requests received from other devices.

5. The method of claim 1, wherein the size of the unsecured portion of the content asset comprises a size configured to have a playing time corresponding to the determined expected time for the user device to receive the requested license.

6. The method of claim 1, wherein the sending the unsecured portion of the content asset comprises sending the user device a first manifest associated with the unsecured portion of the content asset; and
wherein the sending the secured portion of the content asset comprises sending the user device a second manifest associated with the secured portion of the content asset.

7. The method of claim 1, further comprising sending, to the user device, at least one manifest, wherein the at least one manifest comprises data associated with the unsecured portion of the content asset and data associated with the secured portion of the content asset.

8. A method comprising:
receiving, from a user device, a request for a content asset;
determining, based on an expected time associated with processing a license associated with the content asset, a first portion of the content asset;
sending, to the user device, the first portion of the content asset, wherein the first portion of the content asset is unsecured; and
sending, after processing the license, a second portion of the content asset, wherein the second portion of the content asset is secured.

9. The method of claim 8, wherein the determining the first portion of the content asset comprises determining, based on the expected time associated with processing the license, a size of the first portion of the content asset.

10. The method of claim 8, wherein the determining the first portion of the content asset comprises determining, based on the expected time associated with processing the license, a portion of the content asset that has a playing time corresponding to the determined expected time associated with processing the license.

11. The method of claim 8, wherein the method comprises sending the license to the user device.

12. The method of claim 8, wherein the sending the first portion of the content asset comprises sending the user device a first manifest associated with the first portion of the content asset; and
wherein the sending the second portion of the content asset comprises sending the user device a second manifest associated with the second portion of the content asset.

13. The method of claim 8, wherein the determining the expected time associated with processing the license is at least based on a quantity of requests received from other devices.

14. The method of claim 8, wherein the determining the expected time associated with processing the license is at least based on a condition of a network.

15. A computing device comprising:
one or more processors; and
memory storing instructions that, when executed by the one or more processors, cause the computing device to:
receive, from a user device, a request for a content asset;
determine an expected time associated with processing a license associated with the content asset for the user device;
send, to the user device, an unsecured portion of the content asset, wherein a size of the unsecured portion of the content asset is based on the determined expected time; and
send, after processing the license, a secured portion of the content asset.

16. The computing device of claim 15, wherein the instructions, when executed, cause the computing device to send, to the user device, at least one manifest, wherein the at least one manifest comprises data associated with the unsecured portion of the content asset and data associated with the secured portion of the content asset.

17. The computing device of claim 15, wherein the instructions that cause the computing device to determine the expected time associated with processing the license cause the computing device to determine the expected time at least based on an expected time associated with the user device receiving the license.

18. The computing device of claim 15, wherein the instructions that cause the computing device to determine the expected time associated with processing the license cause the computing device to determine the expected time at least based on a condition of a network.

19. The computing device of claim 15, wherein the instructions that cause the computing device to determine the expected time associated with processing the license cause the computing device to determine the expected time at least based on a quantity of requests received from other devices.

20. The computing device of claim 15, wherein the instructions that cause the computing device to send the unsecured portion of the content asset cause the computing device to send the user device a first manifest associated with the unsecured portion of the content asset; and
wherein the instructions that cause the computing device to send the secured portion of the content asset cause the computing device to send the user device a second manifest associated with the secured portion of the content asset.

* * * * *